(No Model.)
A. SMITH.
CAN FOR THE MANUFACTURE OF ICE.
No. 472,407. Patented Apr. 5, 1892.
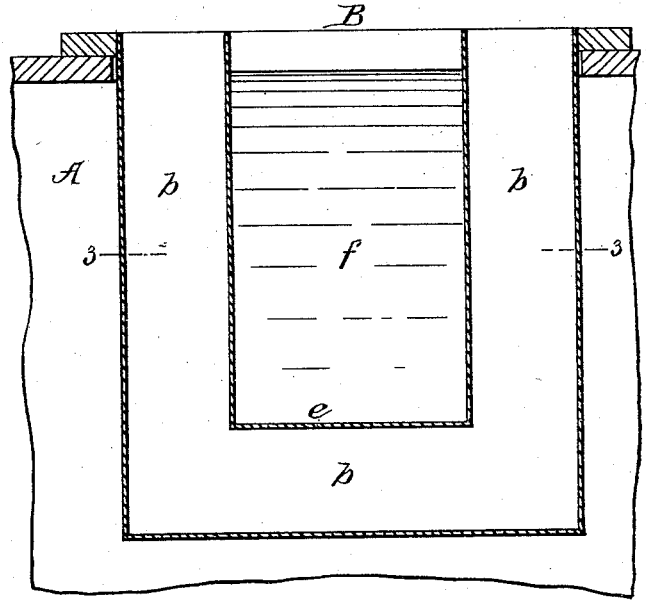
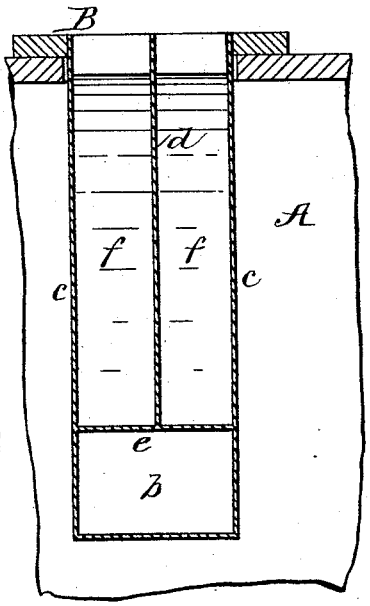
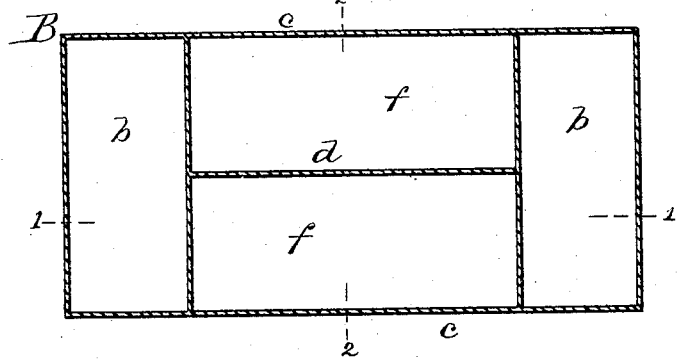
WITNESSES:
J. A. Bergstrom
C. Sedgwick
INVENTOR:
A. Smith
BY Munn & Co.
ATTORNEYS

UNITED STATES PATENT OFFICE.

ALBERT SMITH, OF NEW YORK, N. Y.

CAN FOR THE MANUFACTURE OF ICE.

SPECIFICATION forming part of Letters Patent No. 472,407, dated April 5, 1892.

Application filed December 14, 1891. Serial No. 414,959. (No model.)

*To all whom it may concern:*

Be it known that I, ALBERT SMITH, of New York city, in the county and State of New York, have invented a new and useful Improvement in Cans for the Manufacture of Artificial Ice, of which the following is a full, clear, and exact description.

My invention relates to cans used in apparatus or machines for making ice by immersing the can containing the water to be frozen in brine or other freezing agent contained within a congealing tank or vessel.

The object of the invention is to produce clear cakes or blocks of artificial ice free from a white or impure "center" or "core," as it is termed, and this without the aid of any agitating device operating within the water being frozen.

The invention consists in an ice-can of novel construction and which is provided with an air chamber or chambers that restricts the freezing of the water within the can to a given direction, that will throw the white or impure ice to the exterior of the cake or block, where it may be readily removed, thus leaving the remainder clear or transparent, substantially as hereinafter described, and more particularly pointed out in the claims.

Reference is to be had to the accompanying drawings, forming a part of this specification, in which similar letters of reference indicate corresponding parts in all the figures.

Figure 1 represents a longitudinal vertical section upon the line 1 1 in Fig. 3 of an ice-can embodying my invention and shown as arranged or suspended within a congealing-tank, which is shown only in part. Fig. 2 is a vertical section of the same at right angles to Fig. 1 upon the line 2 2 in Fig. 3, and Fig. 3 is a longitudinal section of the can upon the line 3 3 in Fig. 1.

A is the congealing-tank of an ice apparatus and which may be of any suitable construction. The form of can B which I have selected to illustrate my invention, and which is designed to be immersed or suspended in the brine or other freezing agent within the tank A, is shown as of rectangular oblong shape, with an air chamber or chambers $b$ extending down its two ends and underneath its bottom, leaving its sides $c\,c$ between the chambered ends single or without any air-chamber outside of them. Connecting the two ends of the can between their opposite outside air chambers or spaces is a central partition $d$, extending from the top to the bottom $e$ of the can.

When such a can, charged with water to be frozen within the compartments $f\,f$ on opposite sides of the partition $d$, is suspended or immersed in the brine or freezing agent within the tank the air chamber or chambers $b$, extending down the ends and under the bottom of the can, will cause the freezing of the water to take place in one direction only, as it were—that is, through the exposed sides $c\,c$, between the end air-chambers $b$, and toward or against opposite sides of the partition $d$. This will make the cloudy or impure white portion of each cake or block of ice contained within the compartments $f\,f$ to be thrown against the partition $d$ on each side of it, so that when the cakes or blocks are removed from the can said cloudy or impure white portion of them corresponding to the core will be restricted to the one side of each of them, where it is readily removable—as, for instance, by sliding or running the cakes from where they leave the can down an inclined plane leading to the ice-house—and armed with cutters to shave off the white or impure side portion of each cake, or said objectionable portion of each cake may be otherwise removed with facility by reason of its being on the exterior and one side only of the cake, thus leaving a clear cake or block of ice.

By the use of the partition $d$ in the can two cakes or blocks of ice are produced at the same time with the one can.

Having thus described my invention, what I claim as new, and desire to secure by Letters Patent, is—

1. A can or receptacle for water to be frozen, constructed externally with an air chamber or chambers on or throughout its bottom and two of its opposite sides or ends, and with its other two opposing sides left uncovered or exposed, substantially as and for the purpose set forth.

2. A can or receptacle for water to be frozen, constructed externally with an air chamber or chambers on or throughout its bottom and two of its opposite sides or ends, with its other
5 opposing sides left uncovered or exposed and provided with a central vertical partition between the ends having exterior air chambers or spaces, essentially as and for the purposes specified.

ALBERT SMITH.

Witnesses:
   ELLIS L. SPACKMAN,
   HENRY LEBWILLS.